Dec. 2, 1930.  L. A. CHAMBERS  1,783,640
HOSPITAL APPLIANCE
Filed Nov. 20, 1929
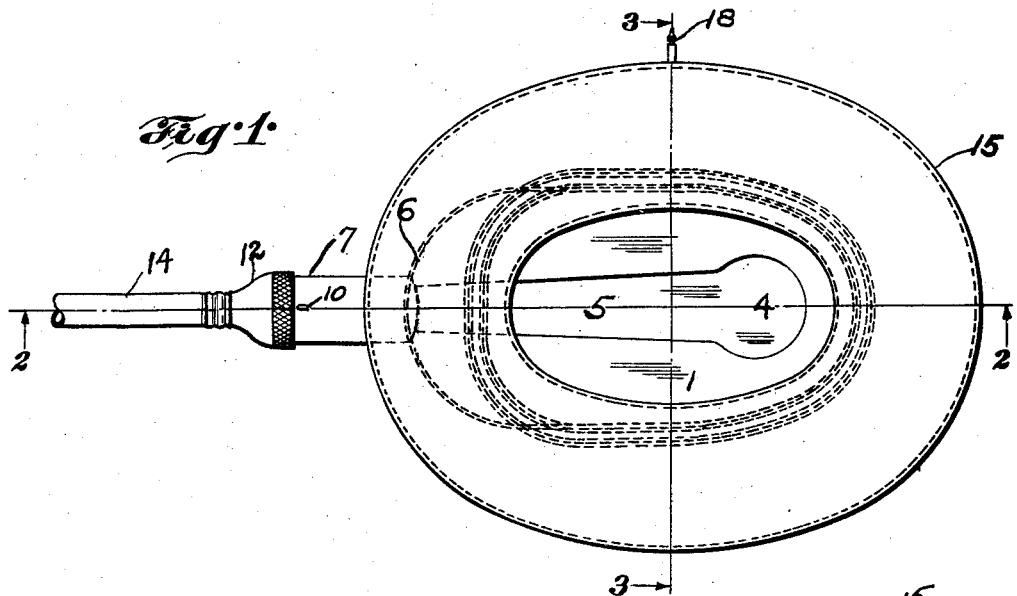
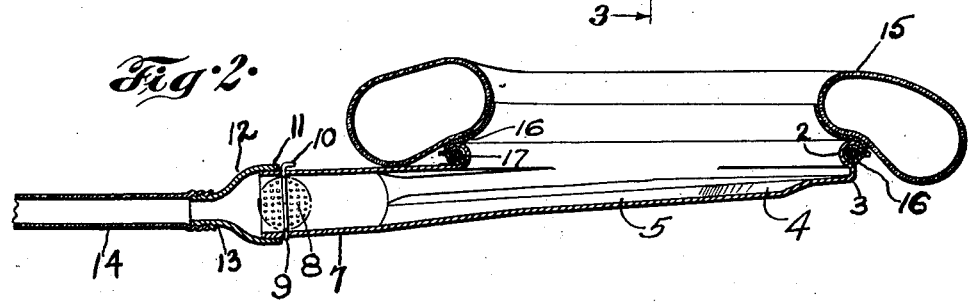
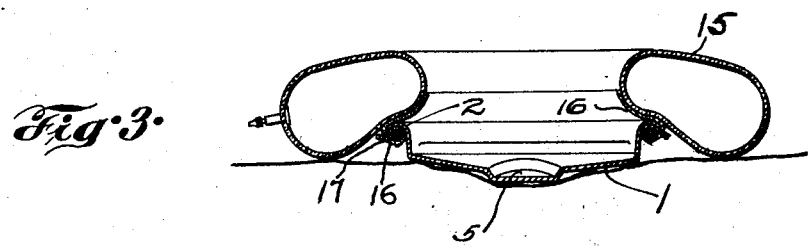
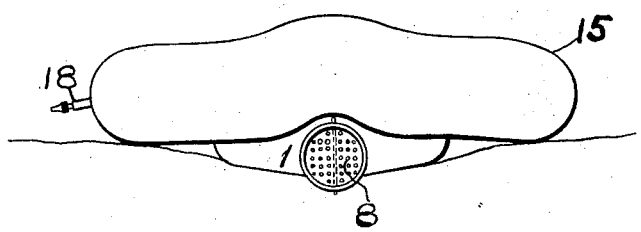
Inventor
Laura A. Chambers
By Rodney Bedell
Attorney Patented Dec. 2, 1930

1,783,640

UNITED STATES PATENT OFFICE

LAURA A. CHAMBERS, OF ST. LOUIS, MISSOURI

HOSPITAL APPLIANCE

Application filed November 20, 1929. Serial No. 408,629.

My invention relates to sick bed equipment and consists in a novel bed vessel particularly adapted for use by invalids lacking control of their bladder and bowel movements.

The general objects of my present invention are similar to those enumerated in my copending application, Serial Number 268,507, filed April 9, 1928; namely to provide a vessel which may be placed under the invalid for indefinite periods without discomfort, and which is adapted to drain continuously or intermittently without the vessel being removed from beneath the patient.

In the manufacture of the device disclosed in my copending application, referred to above, certain difficulties presented themselves, which I have overcome in my present invention.

One of the more particular objects of my present invention is to provide an article of the class described in which a rigid pan and an inflatable ring of rubber or other flexible material may be made by different manufacturers and easily assembled by anyone.

Another object of my invention is to provide an article of the class described in which the pan and the inflatable ring are each renewable so that the device need not be entirely discarded when the pan rusts or is broken or when the ring rots or is torn.

Another object of my invention is to facilitate the separation and reassembly of the pan and ring so that any or all parts of the device may be cleaned easily.

Another object of my inventon is to make the cushion and cooperating apron accessible for cleaning purposes from the top and bottom and have no hidden folds or creases in which urine or solid matter may be retained.

In the accompanying drawings which illustrate a selected embodiment of my invention—

Figure 1 is a top view of the same.

Figures 2 and 3 are vertical sections taken on the lines 2—2 and 3—3, respectively, of Figure 1.

Figure 4 is a left end view of my device with the drainage tube and connection removed.

The device includes a pan 1 of rigid material such as aluminum, enamelware, glass, or the like, having an outwardly turned oval rim 2, and a depression in the base of the pan comprising a forwardly located portion 4, of substantial area, and a converging trough-like portion 5 leading from the portion 4 to the drainage end 6 of the pan.

The drainage end 6 of the pan projects a substantial distance beyond the rim 2 and terminates in a cylindrical drain member 7, near the end of which, I mount a screen 8 on a pin 9 which extends diametrically through the cylinder 7 to restrict or allow the passage of solid material through cylinder 7.

Screwed or otherwise attached to the end 11 of the cylinder 7 is a removable throat member 12 having a discharge end 13 of smaller diameter than the diameter of the cylinder 7 and adapted to fit into the end of a tube 14 which may lead to a bucket or other receptacle beneath the bed or chair on which the bed pan rests.

The throat 12 is adapted to be easily removed from the cylinder 7 to facilitate the cleaning of the cylinder 7 and the screen 8.

An inflatable ring 15 of rubber or other flexible material, provided with a valve 18, is detachably mounted on the pan 1 and positioned to rest outside of the pan on the same surface that supports the pan and at the same time to overlie the upper surface of the drainage end 6 of the pan, a portion of the cylinder 7 and all of the rim 2. The ring is so constructed that each portion of it is adapted to assume a somewhat oval contour, particularly when the weight of the user is superimposed thereon. Thus, the flesh of the user is always held a substantial distance from any part of the pan.

The ring 15 is detachably secured to the pan by means of an apron 16 fastened to the inside periphery of the ring and extending outside of the pan and is held by a cord 17 extending around the sides of the pan and in the recess formed by rim 2. Cord 17 is held from slipping downwardly by the rear end 6 of the pan and the projection 3 at the front end of the pan.

To assemble my device, the inflatable ring 15 is placed over the rim 2 to completely cover the same and rest in addition on the surface that supports the pan and the apron 2 is allowed to extend around the outside of the pan, where it is held in place under rim 2 by the element 17, which may be a band of elastic cord or an ordinary cord tied in place. Preferably, the depending portion of the apron is turned up and stitched over the cord to form a neat finish for the device but, if desired, the apron may be hung straight down and the cord be entirely free of the same.

It is apparent that there may be an appreciable variation in the size of the pan, the inflatable ring or the apron without in any way affecting the ease of assembly of the device.

To remove the ring 15, the cord 17 is merely untied or, if elastic, stretched and pulled over the rim 2 of the pan and the ring lifted off of the pan.

It is a very simple matter to clean my device, as there are no crevices in the rubber in the ring or apron to hold any moisture or matter, and the apron may be turned inside or out and is connected to the ring only along its inner edge, the rest of the apron hanging free when the ring is not attached to the pan.

It is obvious that modifications, other than those mentioned, may be made in the details of the construction of my device without departing from the spirit of my invention, and I contemplate the exclusive use of such modifications as come within the scope of my claims.

I claim:

1. In a device of the character described, a pan of relatively rigid material, a cushion overlying the edge of said pan and surrounding said pan so as to rest upon the surface which also supports said pan, and means detachably securing said cushion to the outside of said pan, said pan being removable downwardly from said cushion when said means is detached.

2. In a device of the character described, a pan of relatively rigid material, a cushion surrounding said pan, a projection on the outside of said pan, an apron depending from said cushion and an element surrounding said apron and holding the same against said projection.

3. In a device of the character described, a pan of relatively rigid material, ring cushion surrounding said pan, an apron extending from the inside of said ring cushion to the outside of said pan, and an elastic means for gripping said apron to said pan.

4. In a device of the character described, a pan of relatively rigid material with elevated outwardly curved rim, a cushion ring surrounding said pan so as to rest upon the surface which also supports said pan and also to overlie the edge of said pan, an apron depending from said cushion and an elastic element holding said apron under the outwardly curved rim of said pan.

5. In a device of the character described, a pan of relatively rigid material with an elevated outwardly curved rim, a compressible ring surrounding said pan so as to rest upon the surface which also supports said pan and providing a cushion overlying the edge of said pan, an apron depending from said ring, and a cord holding said apron under the outwardly curved rim of said pan.

6. In a device of the character described, a pan of relatively rigid material, a compressible ring surrounding said pan so as to rest upon the surface which also supports said pan and providing a cushion overlying the edge of said pan, a recess in the outer contour of said pan, an apron depending from said ring and an element holding said apron in said recess.

7. In a device of the character described, a pan of relatively rigid material, a cushion ring surrounding said pan, a recess in the outer contour of said pan, a flexible apron depending from said ring and an element surrounding said apron and holding the same in said recess.

8. In a device of the character described, a pan of relatively rigid material with an outwardly curved rim, an inflatable ring surrounding said pan, an apron extending from the inside of said ring to the outside of said pan, and an elastic element surrounding said apron and holding the same under the outwardly curved rim of said pan.

9. In a device of the character described, a compressible ring, a pan of relatively rigid material with an outwardly curved rim assembled with said ring so that said rim is positioned intermediate the inner and outer peripheries of said ring, an apron extending from the inner periphery of said ring to the outside of said pan underneath said outwardly curved rim, and an elastic member surrounding said apron and clamping the same underneath said outwardly curved rim.

10. In a device of the character described, a compressible ring, a removable pan of relatively rigid material with an outwardly curved rim assembled with said ring so that said rim is positioned intermediate the inner and outer peripheries of said ring, an apron of flexible material extending from the inner periphery of said ring to the outside of said pan underneath said outwardly curved rim, and a member surrounding said apron and clamping the same underneath said outwardly curved rim.

11. In a device of the character described, a compressible ring, a pan with an outwardly curved rim assembled with said ring so that said rim is positioned intermediate the inner and outer peripheries of said ring, an apron depending from said ring, and a member holding said apron under the outwardly curved rim of said pan.

12. In a device of the character described, a pan of relatively rigid material with an outwardly flanged rim, a tube leading from said pan beneath said rim, a cushion ring surrounding said pan, an apron depending from said ring, and an element about said apron holding the same under said rim and between said rim and said tube.

In testimony whereof I hereunto affix my signature this 16th day of November, 1929.

LAURA A. CHAMBERS.